April 8, 1969 K. E. BURG 3,437,987
UNDERWATER NAVIGATION METHOD AND SYSTEM
Filed July 10, 1967 Sheet 1 of 2

INVENTOR
KENNETH E. BURG

D. Carl Richards

ATTORNEY

INVENTOR
KENNETH E. BURG
ATTORNEY

United States Patent Office 3,437,987
Patented Apr. 8, 1969

3,437,987
UNDERWATER NAVIGATION METHOD AND SYSTEM
Kenneth E. Burg, Dallas, Tex., assignor to Texas Instruments Incorporated, Dallas, Tex., a corporation of Delaware
Filed July 10, 1967, Ser. No. 652,262
Int. Cl. G01s 9/32
U.S. Cl. 340—3        4 Claims

ABSTRACT OF THE DISCLOSURE

A vessel towed by a ship travels underwater in the general region of the bottom. The towed vessel carries a marine Doppler system for propagating directional signals toward the surface of the bottom, for receiving signals reflected from the bottom surface, and for generating navigational information in response to the Doppler frequency shift between the generated and received signals. A temperature responsive device corrects the navigational information for changes in the temperature of the water. The towed vessel also carries a bottom profiler to provide indications of the distance between the underwater bottom surface and the vessel.

---

This invention relates to navigation of surface water craft, and more particularly to the use of a submergible towed vessel having a marine Doppler system for providing navigational information to the towing surface craft.

In the exploration of the ocean to locate mineral resources, to determine physical characteristics of the ocean for use in undersea warfare or for other scientific purposes, it is necessary to have precise information relative to the geodedic location, velocity, heading and track of the exploration ship. Many systems have heretofore been developed for providing navigational information to seagoing exploration ships, such as systems requiring shore based stations for transmitting and receiving signals from the ship, systems requiring an inertial sensor mounted on the ship, or systems utilizing orbiting satellites. However, such systems have generally been quite complex and expensive, as well as being limited in range and being subject to radio propagation errors and the like.

It has thus been previously proposed to mount in surface exploration ships acoustic Doppler systems which direct signals having predetermined frequencies toward the bottom and then receive signal reflections from the bottom in order to determine the Doppler shift of the predetermined frequency. The Doppler shift will be proportional to the velocity of the vessel, and the velocity may be integrated to provide the distance traveled by the ship. Such marine Doppler systems have been generally found to provide acceptable results in relatively shallow water having depths less than 200 to 300 feet.

However, due to attenuation of the relatively high frequencies utilized by such Doppler systems to obtain necessary accuracies, the Doppler return in water depths of greater than about 200 feet in cold regions and 300 feet in warm regions may be from layers of microscopic marine life at shallower depths than the actual underwater bottom surface. Such Doppler derived measurements provided by shipborne marine Doppler systems in deep water may be in error by the amount of drift and motion of the layer of marine life, thereby rendering such systems generally impractical for use in deep water areas where precise navigational accuracy is required.

In previous marine Doppler systems, acoustic transducers have been mounted on the bottom hull of the surface craft. Such positioning of the transducers has not been found to be completely satisfactory, as the transducers often pick up vibrations from the ship's engine and propeller noise. Air bubbles, bow waves and hull ripples resulting from movement of the ship also produce additional sources of noise which may be picked up by the transducers. Further, the rise and fall of the exploration ship upon the sea often shows up as a sawtooth modulation on the Doppler derived measurements, requiring corrections in order to provide precise navigational information for the ship.

In accordance with the present invention, a marine Doppler navigation system is carried by a hydrodynamically stabilized vessel which is towed beneath the surface of the water behind the exploration ship at a depth such that the bottom is within the effective range of the Doppler system. The marine Doppler system directs ultrasonic beams at the underwater bottom surface, receives reflections of the beams from the bottom, and detects the Doppler frequency shift from the originally transmitted frequency to determine the speed of the towed vessel, and consequently the speed of the exploration ship.

By disposing the marine Doppler system within several hundred feet of the bottom, true reflections of the bottom surface are obtained so that the precise position of the towed vessel and ship can be determined. Further, by operating the marine Doppler system beneath the surface of the water and away from the tow ship, a substantial amount of noise is eliminated. The accuracy of the marine Doppler system is also improved because the hydrodynamically stabilized underwater craft eliminates the effects of the pitch, roll and yaw of a surface ship on the Doppler system.

For a more complete understanding of the present invention and for further objects and advantages thereof, reference may now be had to the following description taken in conjunction with the accompanying drawings in which.

Figure 1:
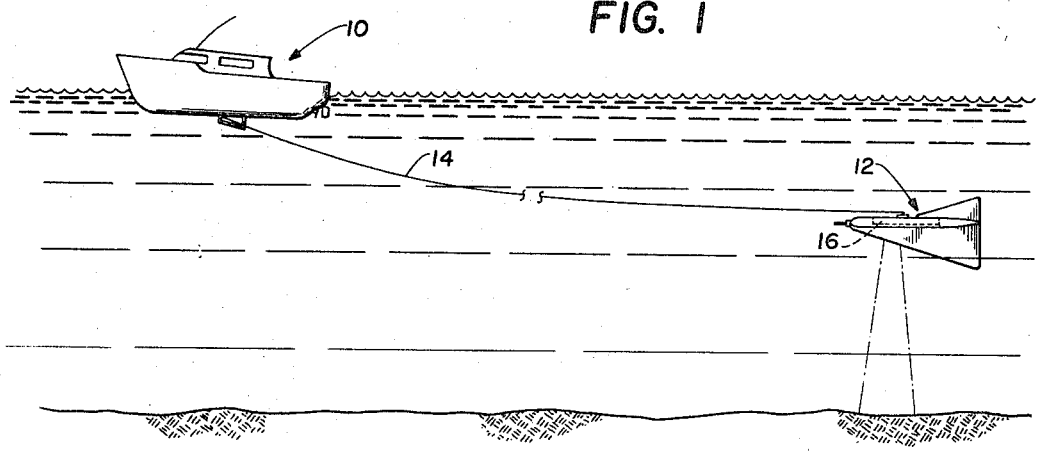
FIGURE 1 is a somewhat diagrammatic view of an exploration ship towing an underwater vessel including a marine Doppler system.

Referring to FIGURE 1, an exploration ship designated generally by the numeral 10 is shown towing a submerged hydrodynamically stabilized vessel, designated generally by the numeral 12, by means of a cable 14. The cable 14 includes electrical conductors for providing communication between the vessel 12 and the ship 10. A suitable winch mechanism (not shown) is located aboard the ship 10 for automatically reeling the cable 14 in and out. A measuring device is preferably provided on the winch for determining the length of cable 14 which is extended from the ship 10 in order that the vessel 12 may be accurately positioned at the desired depth. When not in use, the vessel 12 may be stored in a suitable inverted cradle underneath the hull of the ship 10.

An acoustic marine Doppler system 16 is installed in a water tight compartment inside the underwater vessel 12. The Doppler system may consist of any one of a number of suitable systems, but is preferably of the general type which directs ultrasonic beams toward the bottom surface of the ocean and receives reflections which have a Doppler shifted frequency. The measured Doppler frequency shift is a direct indication of the speed of the vessel 12. This speed indication may be transmitted through the electrical conductors in cable 14 to the ship 10, where it is recorded on a suitable recording or display device. Alternatively, only the ultrasonic transmitting and receiving transducers may be located on the vessel 12, with the Doppler frequency shift sensing circuitry being located on board the ship 10.

In most instances, the vessel 12 will be towed behind the ship 10 at a depth such that the vessel is within at least 200 to 300 feet from the bottom surface of the body of water. In this manner, spurious reflections from marine life in the water will be eliminated, and precise indications of the speed of the vessel will be presented. As the distance between the ship 10 and the towed vessel 12 is determined by the length of the extended cable 14, the navigational information provided with respect to the towed vessel 12 is directly applicable to the ship 10. If desired, a more complex system for the determination of the distance between ship 10 and vessel 12 may be provided, such as an acoustic pinger or the like.

Figure 2:
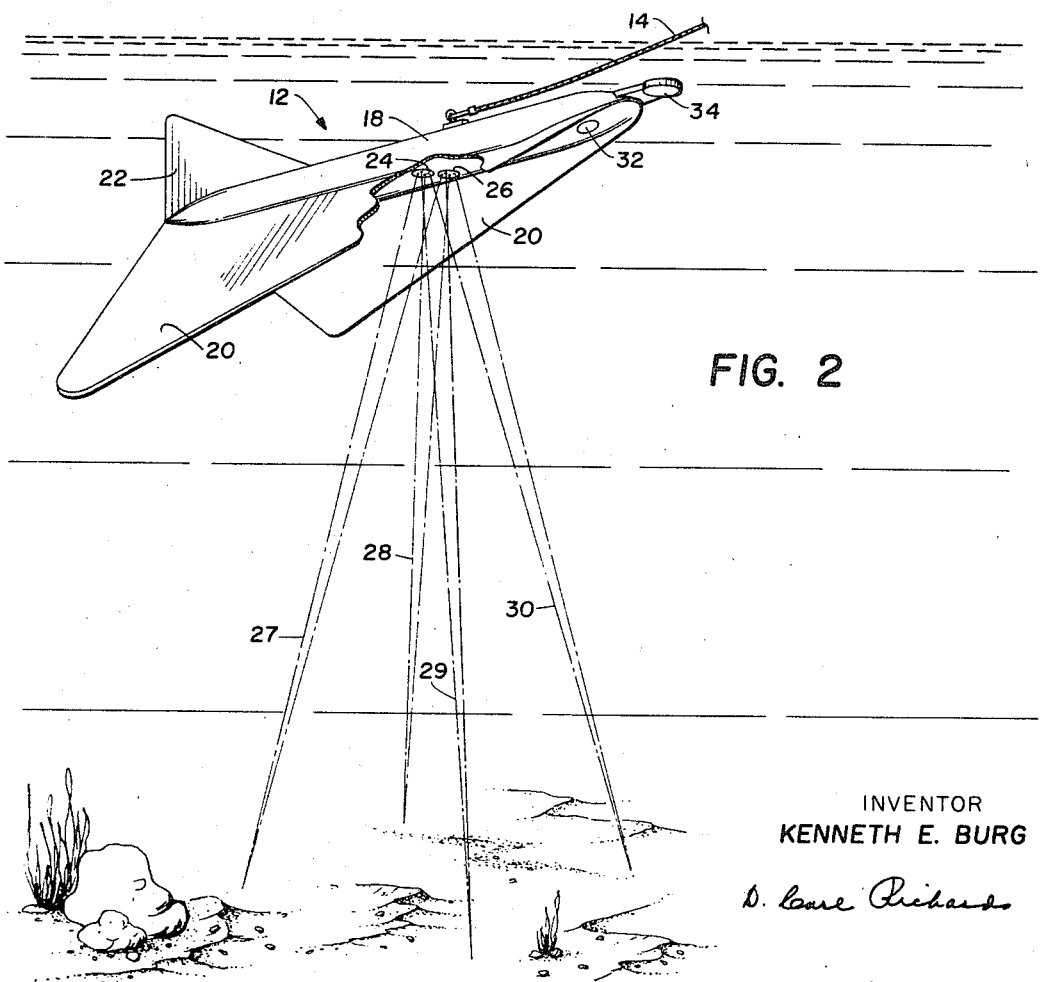
FIGURE 2 is a more detailed view of a towed underwater vessel including a marine Doppler navigation system.

While it will be understood that a myriad of different types of towable underwater vessels may be used in the present invention, a vessel of the general type illustrated in FIGURE 2, manufactured and sold under the trademark V–FIN by the Braincon Corporation of Marion, Mass., may be advantageously used. In particular, the type 120 UQN and the type 159 V–FIN may be used. Vessels of this type comprise an elongated main body portion 18 which includes a water tight compartment for carrying electronic circuitry. A pair of swept-back wings 20 extend horizontally from opposite sides of the body 18 and slope downwardly in order to provide stabilization to the vessel during movement through the water. A vertical fin 22 extends from the rearmost portion of the body 18 also for stabilization purposes.

While the present invention may be practiced with any one of a number of conventional marine acoustic Doppler systems, FIGURE 2 illustrates a Doppler system utilizing two transducer units 24 and 26, each consisting of four transducing elements. Such a marine Doppler system is manufactured and sold under the tradename JANUS JN Series Doppler Navigators by Janus Products, Inc., of Syosset, N.Y. The transmitting transducer 24 includes four transmitting heads mounted so that narrow ultrasonic beams 27, 28, 29 and 30 are directed downwardly at angles about 30° from the vertical in fore, aft, starboard and port directions. Each of the beams is transmitted at the same frequency, which may be 600 kilocycles.

The receiving transducer 26 comprises four ultrasonic receivers each differently angled to pick up energy reflected from the bottom surface from a corresponding transmitting element of the transmitter 24. Although the transmitted signal is substantially scattered by the rough underwater bottom surface, the receiving elements are extremely directional and thus generally receive only reflected energy from the appropriate transmitting element.

In accordance with the well known Doppler frequency principle, the frequency of the signal received by a transducer element which is angled toward the direction of motion of the vessel is shifted upwardly, while the frequency received by a transducer element directed away from the direction of motion is shifted downwardly. The difference between the frequencies received by two differently angled receiver elements is generally twice the Doppler shift received from a single beam. With the provision of four transmitted beams, the speed of the vessel 12 may be accurately determined, in addition to any angle of side drift of the vessel 12. Any slight pitch and roll of the vessel 12 will not substantially affect the accuracy of the Doppler system, as such motion will change the Doppler shift of each beam, but the frequency difference between each pair will remain substantially constant.

In addition to the marine Doppler system installed in the vessel 12, it is often advantageous to install a hydrophone 32 in the vessel 12, in order to accurately determine the distance between the vessel 12 and the bottom underwater surface. Hydrophone 32 generates a pulsed signal having a frequency in the range of about 12 kilocycles, the signal being reflected from the ocean bottom surface and received by the hydrophone 32. The time interval between the transmitted pulse and the received reflection provides a direct indication of the distance to the bottom surface. Such information is then transmitted through cable 14 to the exploration ship 10 in order to allow adjustment of the length of the cable 14 to position the vessel 12 closer or further away from the bottom surface as conditions warrant.

It is often desirable to install a temperature sensor 34 in the vessel 12 in order to provide accurate measurements of the temperature of the water. Sensor 34 may comprise any of a number of suitable devices for producing an output signal representative of temperature which is then used in circuitry in the vessel 12 or transmitted through the cable 14 to the exploration ship 10. Indications of the temperature of the water may be used to correct the output of the marine Doppler system for changes in the acoustic properties of the water due to temperature variances.

Figure 3:
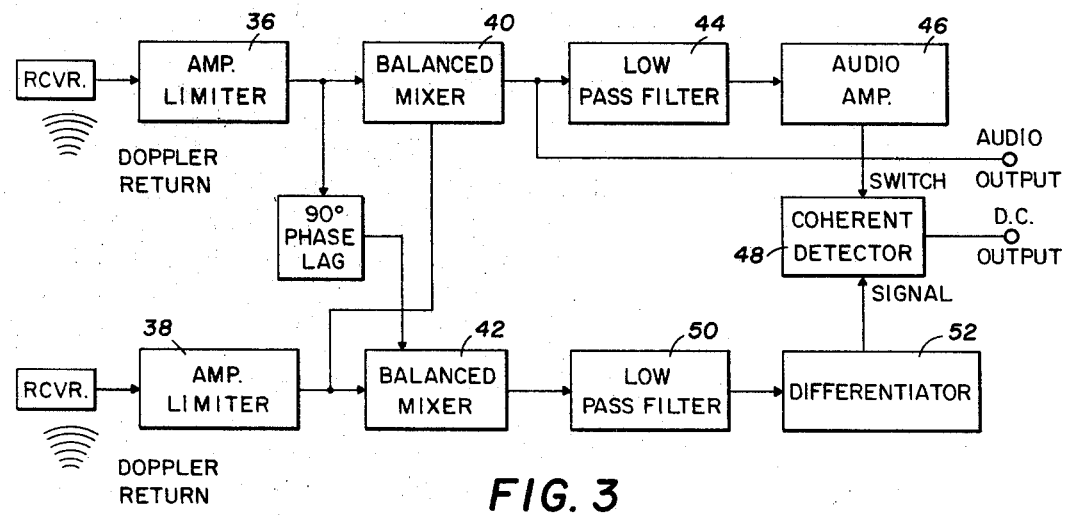
FIGURES 3 and 4 are schematic diagrams of circuitry for determining navigational information from the Doppler shift of signals transmitted and received by the underwater towed vessel according to the invention.

FIGURE 3 illustrates a schematic diagram of circuitry for use with the Janus JN–410 Doppler Navigator, manufactured and sold by Janus Products, Inc., of Syosset, N.Y. This circuitry converts to a DC voltage the frequency difference between a pair of received reflected ultrasonic signals. In the operation of the four beam system illustrated in FIGURE 2, a pair of circuits identical to the one illustrated in FIGURE 3 would be required, one circuit for providing a DC voltage proportional to the fore-aft speed of the vessel 12, and a second circuit for providing a DC voltage proportional to starboard-port motion.

A pair of amplifier and limiting circuits 36 and 38 amplify and limit the output voltage of a pair of receiver transducers. A pair of balanced mixers 40 and 42 are utilized to sense the forward or aft motion of the vessel. Mixer 42 is preceded by a 90° phase lag on one input. The outputs of the mixers 40 and 42 are a corresponding pair of beat frequency signals 90° apart. If the frequency received by the amplifier limiter 38 is greater than the frequency received by the amplifier limiter 36, the output of mixer 40 lags the output of mixer 42 by 90°; whereas if the frequency received by the amplifier limiter 36 exceeds the frequency of the amplifier limiter 38, the output of mixer 40 leads that of mixer 42 by 90°.

The output of the mixer 40 is fed directly to an audio output and is also filtered by a low pass filter 44 and fed through an audio amplifier 46 to the switch input of a coherent detector 48. The output of the mixer 42 is filtered by a filter 50 and fed into a differentiator 52, which produces a sine wave output with a 90° leading phase and an amplitude proportional to frequency. The output from the differentiator 52 is fed into an input of the coherent detector 48.

In operation, the output of the audio amplifier 46 acts as the switch input of the coherent detector 48. The output from detector 48 is a DC signal varying in magnitude in accordance with the input frequency differences. The polarity of the DC output signal will indicate the direction of motion of the vessel 12, as the input from amplifier 46 will be in phase with the input from differentiator 52 if the frequency received by the amplifier limiter 38 is greater than the frequency received by the amplifier limiter 36, and will be out of phase if the reverse is true.

As the propagation velocity of sonic energy in water is dependent upon the temperature of the water, the output from the temperature sensing device 34 may be provided to both the amplifier limiters 36 and 38 in order to compensate for changes in temperature.

As previously described, the circuitry illustrated in FIGURE 3 could be disposed in the exploration ship 10, with the signals from the receiving transducers located on the vessel 12 being transmitted to the ship 10 through the electrical conductors in the cable 14. Alternatively, the circuitry shown in FIGURE 3 could be compactly packaged and transistorized and disposed in the watertight compartment of the vessel 12.

Figure 4:
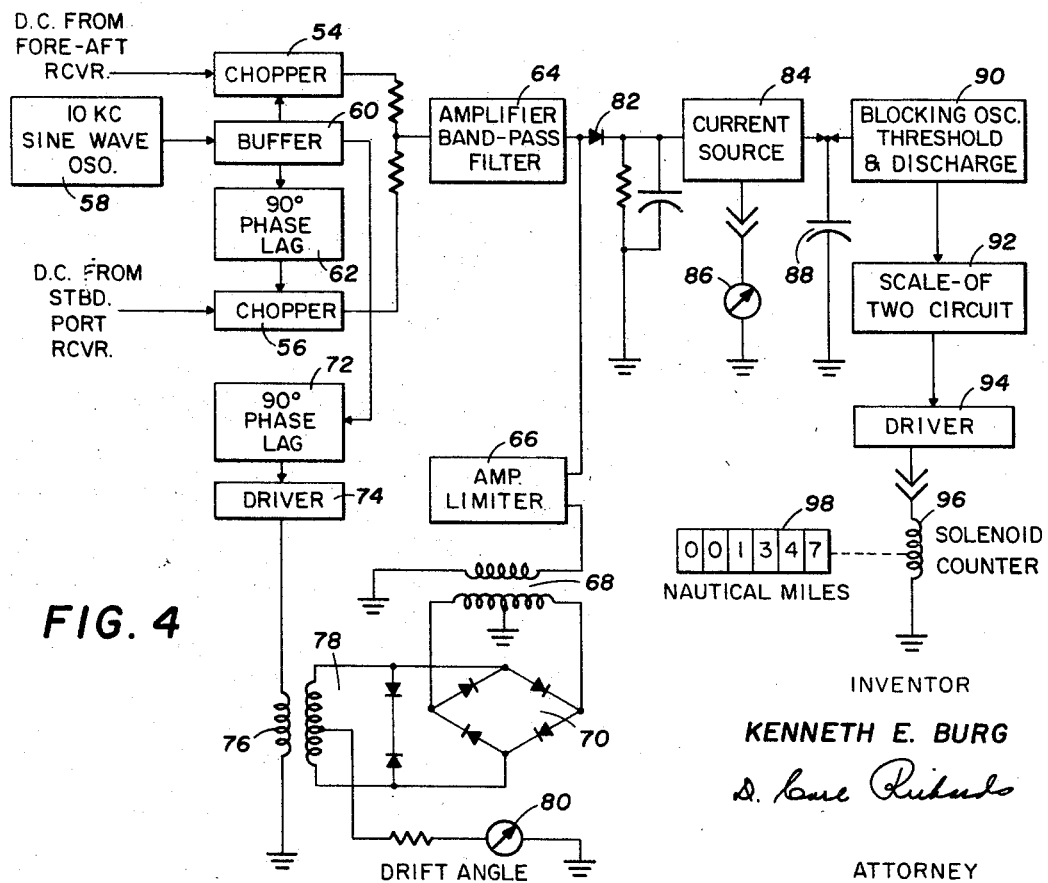

FIGURE 4 illustrates circuitry for receiving the DC signals from both the fore-aft and the starboard-port frequency difference detecting circuitry. The DC signals are fed into choppers 54 and 56, where the signals are chopped at 10 kilocycles by signals in quadrature. A 10 kilocycle sine wave oscillator 58 provides a signal to the chopper 54 through the buffer 60 and to the chopper 56 through the buffer 60 and a 90° phase lag circuit 62. The outputs from the choppers 54 and 56 are added and fed to an amplifier and filter 64. The amplitude of the output signal of the filter 64 is proportional to the speed of the vessel 12, and the phase of the output signal relative to the 10 kilocycle chopping signal is equal to the drift angle.

The output of the amplifier filter 64 is fed through a limiter 66, which provides an output through transformer 68 to a phase detector bridge 70. The output of buffer 60 is fed through a phase shifter 72, which produces a 90° phase lag, to a driver circuit 74, which provides a reference signal across the transformer 76. The output of the phase detector 70 is squared by a limiter circuit 78 and compared with the reference signal, with the resulting difference between the two phases being applied through the meter 80 as an indication of the drift angle of the vessel 12. The meter 80 provides a reading in degrees of the amount the over-the-bottom speed direction deviates from the actual heading of the ship. Meter 80 is calibrated from −90° through zero to +90°.

The output from the amplifier filter 64 is also applied through a rectifier 82 to a current source 84. The magnitude of current from the current source 84 is proportional to the speed of the vessel 12 and is registered on a suitable register meter 86. This speed indication may be permanently recorded by suitable recorders on board the ship 10.

To register the distance traveled from a predetermined point by the vessel 12, the output of the current source 84 is integrated by charging a capacitor 88 with the output of current source 84. At the occurrence of a preset threshold voltage across the capacitor 88, the blocking oscillator 90 fires, thereby discharging the capacitor and providing an output pulse to a scale-of-two-circuit 92. Displacement between the pulses fed into the scale-of-two-circuit 92 is proportional to the speed of the vessel 12. Each two such pulses fed into the circuit 92 operate a driver 94 to move a solenoid counter 96 one count. A readout 98 may be operated by the counter 96 to provide the magnitude of the distance traveled in yards of distance.

The outputs provided by the Doppler systems described with reference to FIGURE 3 and FIGURE 4 may be combined with the outputs of the gyrocompass of ship 10 to provide true speed and course information which may be displayed on a suitable plotter on ship 10. The circuitry of FIGURE 4 may be disposed on ship 10, or a portion of the circuitry may be disposed inside the vessel 12 in the manner previously described.

The present invention thus enables the use of marine Doppler systems in very deep bodies of water, thereby providing precise navigational information to exploration ships without the requirement of complex offshore stations and without accuracy limitations due to inabilities of the Doppler systems to directly reflect off the ocean bottom surface. Further, the use of a marine Doppler system in a submergible vessel towed by an exploration craft eliminates many sources of noise heretofore inherent in hull mounted Doppler transducers.

Having described the invention in connection with certain specific embodiments thereof, it is to be understood that further modifications may be suggested to those skilled in the art and it is intended to cover such modifications as are within the scope of the appended claims.

What is claimed is:
1. In a navigation system for a ship, the combination comprising:
 (a) an elongated body having a watertight instrument compartment and adapted to be towed at substantial depths underwater, a pair of stabilizing wings generally horizontally extending from opposite sides of said body and a fin vertically extending rearwardly from said body,
 (b) cable means connecting a central portion of said body to the ship for towing said body underwater and for providing electrical communication between said body and the ship,
 (c) transducer means carried on the underside of said body for directing angled ultrasonic signals toward the underwater bottom in fore, aft, port and starboard directions,
 (d) receiver means carried by said body for receiving reflections of each said angled signals from the underwater bottom surface to generate output signals indicative of the Doppler frequency shifts of said reflections,
 (e) circuitry responsive to said output signals to provide navigational information for the ship, and
 (f) temperature-sensing means within said body for generating output signals representative of the temperature of the water, said output signals being applied to said circuitry to correct for temperature effects on the velocity of the ultrasonic signals through the water.

2. The combination defined in claim 1 and further comprising:
 sonar profiler means located within said body for providing signals representative of the distance between said vessel and the underwater bottom surface.

3. The combination defined in claim 1 wherein said circuitry is carried within said body,
 said cable means transmitting said navigational information from said body to the ship for display thereof.

4. The combination defined in claim 1 wherein said circuitry is located aboard the ship,
 said cable means connecting said receiver means to said circuitry for transmitting said output signals from said body to said circuitry.

References Cited
UNITED STATES PATENTS

| | | | |
|---|---|---|---|
| 2,964,729 | 12/1960 | Beebe et al. | 340—3 |
| 3,137,264 | 6/1964 | Brainard et al. | 114—235 |
| 3,153,220 | 10/1964 | Hagemann | 340—3 |
| 3,257,638 | 6/1966 | Kritz et al. | 340—3 |
| 3,351,895 | 11/1967 | Cupp et al. | 340—3 |

OTHER REFERENCES

Holmes: Navigation, vol. 12, No. 4, Winter 1965–66, pp. 287, 291 and 292 relied on.

RICHARD A. FARLEY, *Primary Examiner.*